(12) United States Patent
Higgins-Luthman et al.

(10) Patent No.: US 7,872,764 B2
(45) Date of Patent: Jan. 18, 2011

(54) MACHINE VISION FOR PREDICTIVE SUSPENSION

(75) Inventors: Michael J. Higgins-Luthman, Livonia, MI (US); Yuesheng Lu, Farmington Hill, MI (US); Duane W. Gebauer, Gregory, MI (US)

(73) Assignee: Magna Electronics Inc., Holly, MI (US)

(*) Notice: Subject to any disclaimer, the term of this patent is extended or adjusted under 35 U.S.C. 154(b) by 288 days.

(21) Appl. No.: 12/251,672

(22) Filed: Oct. 15, 2008

(65) Prior Publication Data
US 2009/0097038 A1 Apr. 16, 2009

Related U.S. Application Data

(60) Provisional application No. 60/980,265, filed on Oct. 16, 2007.

(51) Int. Cl.
G01B 11/30 (2006.01)
G01B 11/24 (2006.01)
B60G 17/018 (2006.01)
B60G 17/056 (2006.01)
B60G 17/005 (2006.01)

(52) U.S. Cl. .................. 356/602; 356/603; 280/5.5
(58) Field of Classification Search .......... 356/600–640
See application file for complete search history.

(56) References Cited

U.S. PATENT DOCUMENTS

| | | | | |
|---|---|---|---|---|
| 4,600,215 A * | 7/1986 | Kuroki et al. | ............ | 280/5.519 |
| 4,634,142 A * | 1/1987 | Woods et al. | ............ | 280/5.503 |
| 4,781,465 A * | 11/1988 | Demachi et al. | ............ | 356/602 |
| 4,792,232 A * | 12/1988 | Jobe et al. | ............ | 356/394 |
| 4,827,416 A * | 5/1989 | Kawagoe et al. | ............ | 701/38 |
| 5,061,932 A | 10/1991 | Tribe et al. | | |
| 5,163,319 A * | 11/1992 | Spies et al. | ............ | 73/146 |
| 5,347,457 A * | 9/1994 | Tanaka et al. | ............ | 701/37 |
| 5,450,322 A | 9/1995 | Tanaka et al. | | |
| 5,652,655 A | 7/1997 | Uno et al. | | |
| 6,028,948 A | 2/2000 | Kil et al. | | |
| 6,122,578 A * | 9/2000 | Knolle | ............ | 701/37 |
| 6,233,510 B1 * | 5/2001 | Platner et al. | ............ | 701/37 |
| 6,980,291 B2 * | 12/2005 | Saito | ............ | 356/237.2 |

\* cited by examiner

*Primary Examiner*—Gregory J Toatley
*Assistant Examiner*—Jarreas C Underwood
(74) *Attorney, Agent, or Firm*—Van Dyke, Gardner, Linn & Burkhart, LLP

(57) ABSTRACT

A predictive suspension system for a vehicle includes an imaging sensor, and energy source and a control. The imaging sensor is disposed at a vehicle and has a generally downward field of view, with the field of view encompassing an area forward of a tire of the vehicle. The energy source is operable to emit illumination in at least one linear pattern so that the linear pattern is projected onto a portion of the area forward of the tire of the vehicle that is encompassed by the field of view of the imaging sensor. The control processes image data captured by the imaging sensor and detects surface irregularities on a surface in front of the vehicle tire in response to the image processing.

12 Claims, 6 Drawing Sheets

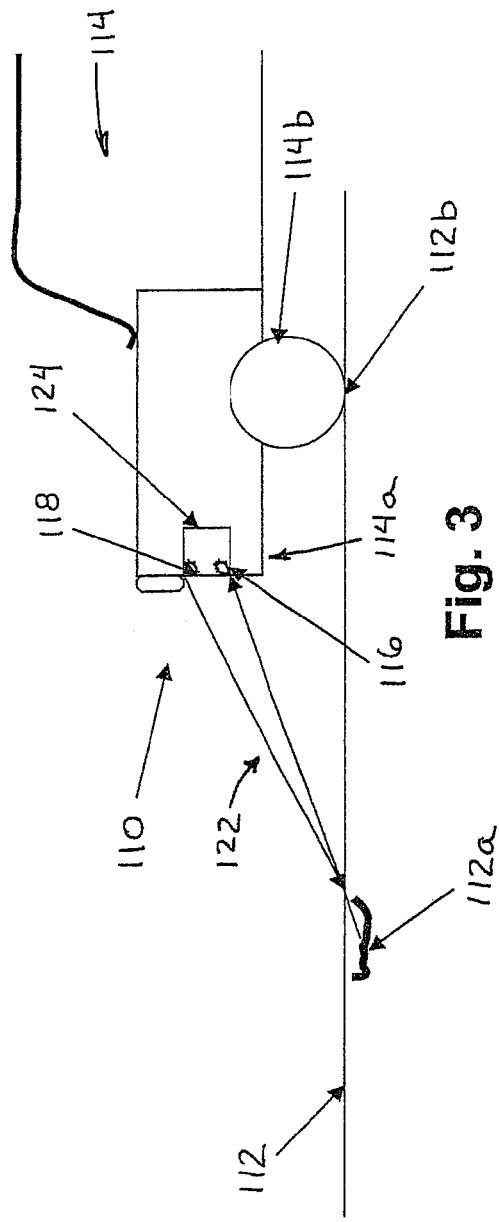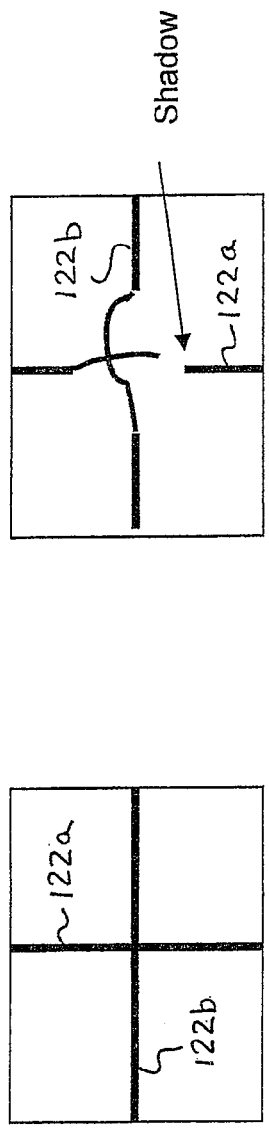

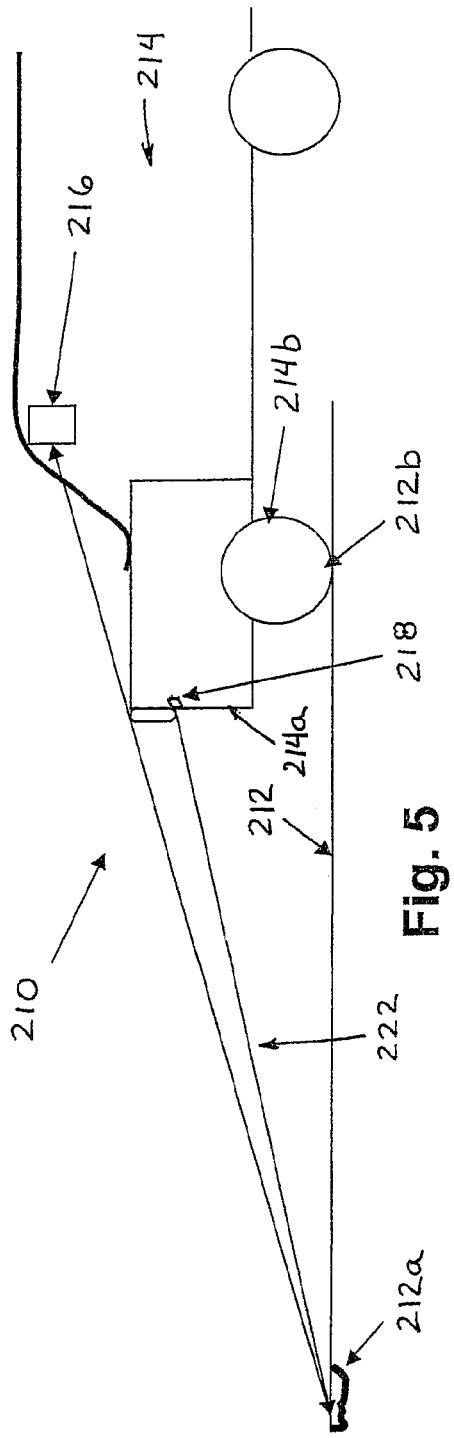
Fig. 5
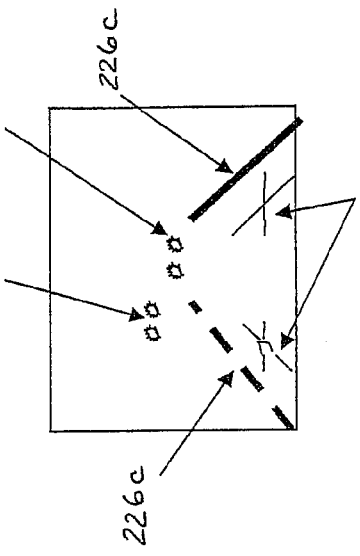
Fig. 6C
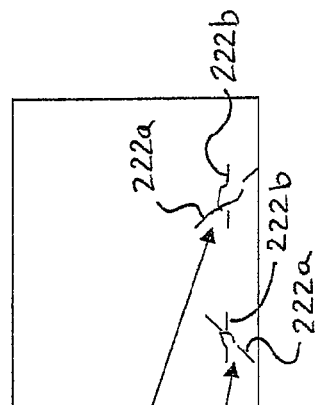
Fig. 6B
Fig. 6A

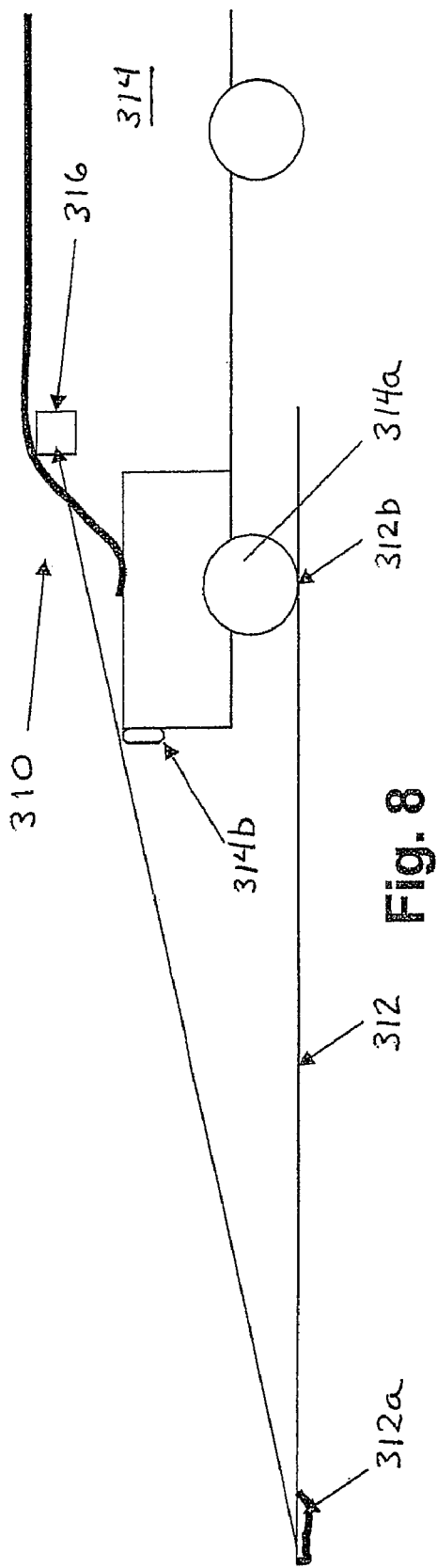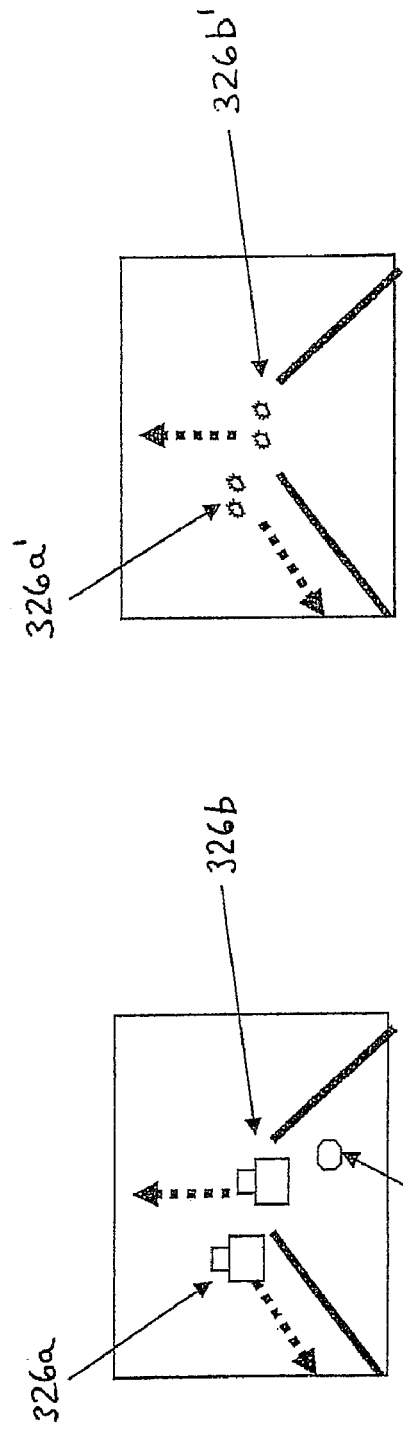

MACHINE VISION FOR PREDICTIVE SUSPENSION

CROSS REFERENCE TO RELATED APPLICATION

The present application claims the benefit of U.S. provisional application Ser. No. 60/980,265, filed Oct. 16, 2007, which is hereby incorporated herein by reference in its entirety.

FIELD OF THE INVENTION

The present invention relates to vision systems for vehicles and, more particularly, to a forward facing vision or imaging system of a vehicle.

BACKGROUND OF THE INVENTION

It is known to utilize a forward facing camera to see color or gray scale changes to determine a road profile in front of a vehicle to detect bumps or potholes in front of the vehicle. It is also known to use a laser and to detect potholes by determining the time of the reflection of the laser determining or calculating a height or depth of the pothole or bump via triangulation calculations. It is also known to use an illumination source and camera at acute angles to produce significant shadowing at bumps and/or potholes. Examples of various road surface detection devices or systems or methods are disclosed in U.S. Pat. Nos. 4,781,465; 5,061,932; 5,163,319; 5,652,655; and 6,028,948, which are hereby incorporated herein by reference in their entireties.

SUMMARY OF THE INVENTION

The present invention provides a vision system and suspension control system or predictive suspension system for a vehicle that detects bumps and/or potholes and/or the like on the road in front of the vehicle and adapts or adjusts the vehicle suspension accordingly. The predictive suspension system of the present invention may utilize a forward facing image sensor that captures images of the road surface in front of the vehicle, whereby the images are processed to determine if bumps and/or potholes and/or the like are present in the vehicle path of travel. The predictive suspension system of the present invention utilizes a laser line pattern that is projected or emitted onto and/or along and/or across an area in the travel path of a vehicle tire, whereby the imaging device captures images of the area encompassed by the laser line pattern. A detected deviation of the laser line or lines from a linear line or intersecting lines is indicative of a road surface irregularity or morphology, such as a bump or pothole at the road surface in front of the vehicle tire.

According to an aspect of the present invention, a predictive suspension system for a vehicle includes an imaging sensor disposed at the vehicle and having a generally downward field of view, with the field of view encompassing an area forward of a tire of the vehicle, an energy source or illumination emitter or laser emitter, and a control. The energy source is operable to emit illumination in at least one linear pattern (such as by emitting laser line segments in a cross-hair pattern or grid pattern of intersecting line segments or the like) so that the linear pattern of light or energy (such as near infrared or infrared light or energy) is projected onto a portion of the area forward of the tire of the vehicle that is encompassed by the field of view of the imaging sensor. The control processes image data captured by the imaging sensor and detects surface irregularities (such as bumps and/or potholes and/or objects and/or road kill and/or the like) on a surface in front of the vehicle tire in response to the image processing. The predictive suspension system may generate an output indicative of a detection of a surface irregularity, and an active suspension system may be responsive to the output of the predictive suspension system.

Optionally, the control may process the image data to detect a curvature of at least one of the line segment patterns of illumination (in the captured image) to determine a surface irregularity. The control may process the image data to determine a height or depth of a detected surface irregularity via determining a degree of detected curvature of at least one of the line segment patterns of illumination.

Optionally, the energy source or laser line or plane emitter may be disposed at a forward portion of the vehicle and generally in line with the tire of the vehicle, with the energy source projecting the at least one linear pattern of illumination downwardly and forwardly in a direction that is generally parallel with the direction of travel of the tire. Optionally, the imaging sensor may be disposed at a forward portion of the vehicle and directed generally downwardly so as to capture images of a road surface area in front of the vehicle tire, or the imaging sensor may be disposed at a forward portion of the vehicle and directed generally forwardly and downwardly so as to capture images of a road surface area in front of the vehicle. Optionally, the imaging sensor may be disposed at an interior rearview mirror assembly of the vehicle and may have a forward field of view through the windshield of the vehicle that encompasses a road surface area in front of the vehicle. Optionally, the predictive suspension system at least one of (a) shares components or circuitry with and (b) accesses components or circuitry of one or more other image based or vision based systems, such as a headlamp control system, a lane departure warning system, an object detection system, and a rain sensor system and/or the like.

According to another aspect of the present invention, a multi-stage predictive suspension system for a vehicle includes a first imaging sensor disposed at a vehicle and having a field of view at least encompassing a first area forward of a tire of the vehicle, a second imaging sensor disposed at the vehicle and having a field of view at least encompassing a second area forward of the tire of the vehicle, and a control. The second area is closer to the tire than the first area. The control processes image data captured by the first and second imaging sensors and detects surface irregularities on a surface in front of the vehicle tire in response to the image processing. The control processes captured images of the first imaging sensor to provide an advance alert of a detected surface irregularity prior to detection of the detected surface irregularity by the second imaging sensor.

The multi-stage system thus may provide an advance warning or alert of a detected surface irregularity via the first imaging sensor, such as an imaging sensor detecting an area several meters in front of the vehicle or vehicle tire (such as, for example, about 6 meters to about 20 meters or more in front of the vehicle or vehicle tire), and the system may provide enhanced detection and/or profiling of the detected surface irregularity via the second imaging sensor that detects an area closer to the vehicle than the first area (such as, for example, an area that is about 6 meters or less, such as 3 meters or 1 meter or thereabouts, in front of the vehicle or vehicle tire). The multi-stage predictive suspension system may further include an energy source operable to emit illumination in at least one linear pattern at the second area so that the at least one linear pattern is projected onto at least a portion of the second area forward of the tire of the vehicle that is encompassed by the field of view of the second imaging sensor. The control processes the image data captured by the second imaging sensor to detect a curvature of the at least one linear pattern that is indicative of a surface irregularity. The multi-stage predictive suspension system may adjust the second imaging sensor frame capture rate or timing in response to the alert, and/or may adjust the illumination by the energy source in response to the alert, and/or may adjust an active suspension control in response to the alert.

These and other objects, advantages, purposes and features of the present invention will become apparent upon review of the following specification in conjunction with the drawings.

BRIEF DESCRIPTION OF THE DRAWINGS

FIG. 3 is a schematic of another predictive suspension system at a front portion of a vehicle in accordance with the present invention;

FIG. 4A is a schematic of an image captured by the imaging device of the predictive suspension system of FIG. 3 when there is no detectable surface irregularity imaged;

FIG. 4B is a schematic of an image captured by the imaging device of the predictive suspension system of FIG. 3 when there is a detectable surface irregularity imaged;

FIG. 5 is a schematic of another predictive suspension system of a vehicle in accordance with the present invention;

FIG. 6A is a schematic of an image captured by the imaging device of the predictive suspension system of FIG. 5 when there is no detectable surface irregularity imaged;

FIG. 6B is a schematic of an image captured by the imaging device of the predictive suspension system of FIG. 5 when there is a detectable surface irregularity imaged;

FIG. 6C is a schematic of an image captured by the imaging device of the predictive suspension system of FIG. 5, showing that the captured image may be processed to derive other information for other vision systems of the vehicle;

FIG. 8 is a schematic of another predictive suspension system of a vehicle in accordance with the present invention;

FIG. 9A is a schematic of an image captured by the imaging device of the predictive suspension system of FIG. 8 during daytime operating conditions;

FIG. 9B is a schematic of an image captured by the imaging device of the predictive suspension system of FIG. 8 during nighttime operating conditions.

DESCRIPTION OF THE PREFERRED EMBODIMENTS

Figure 1:
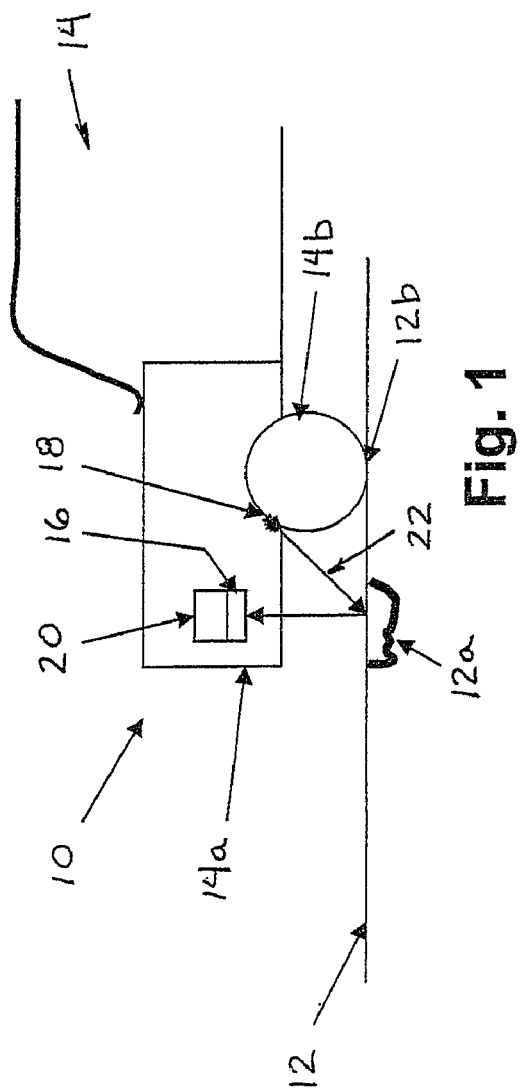
FIG. 1 is a schematic of a predictive suspension system at a front portion of a vehicle in accordance with the present invention.

Referring now to the drawings and the illustrative embodiments depicted therein, a predictive suspension system 10 (FIG. 1) is operable to detect the presence of bumps and/or potholes 12a and/or other surface irregularities on a road surface 12 at the front or in front of a vehicle 14. The predictive suspension system 10 may adjust or control or adapt the suspension elements or system of the vehicle in response to such detection, such as by adjusting a rigidity or damping characteristic of a vehicle suspension device (such as a shock absorber or the like at the wheel that is approaching a detected surface irregularity), such as by utilizing aspects of any suitable suspension adjustment systems or means, such as by utilizing aspects of the systems described in U.S. Pat. Nos. 5,347,457; 5,450,322; 6,122,578; and/or 6,233,510, which are hereby incorporated herein by reference in their entireties.

The predictive suspension system 10 of the present invention includes an imaging sensor or camera system 16, such as a special equipped camera system having a pixelated imaging array sensor or the like, that is at a forward portion 14a of the vehicle 14 and that has a generally downward field of view so as to encompass an area that is forward of a tire 14b and in the direction of travel of the vehicle. In the illustrated embodiment of FIG. 1, the camera 16 is mounted at a forward portion of the vehicle and is offset inboard of the centerline of an associated tire 14b (but could be offset outboard of the centerline of the tire without affecting the scope of the present invention), and has its field of view generally downward and forward of the tire so as to encompass an area forward of the tire's path of travel. The images captured may include the road surface in front of the tire and encompassing the entire width of the tire, so as to provide a more complete morphology of the entire road-to-tire interface.

Predictive suspension system 10 includes an energy emitter or laser line emitter or laser plane emitter 18, which is arranged generally inline with the centerline of the associated tire and is directed forwardly along the forward path of travel of the tire and generally downward so as to generate a laser line along the road surface in front of the tire (and at the area encompassed by the camera's downward field of view). The laser line emitter 18 may generate a straight laser line (such as via emitting laser light in a generally vertical plane or via rastering or rotating a laser diode back and forth in a rapid manner to generate a linear light pattern, such as in a manner known in the art of laser plane and/or laser line generation) along the road surface and in the direction of travel of the vehicle, or may generate a cross-hair or grid type pattern or arrangement of intersecting laser lines (such as by generating laser lines or laser line segments that are generally orthogonal to one another), with the intersection of the laser lines being within the camera's field of view. The laser line emitter may comprise a laser diode or laser diodes or the like, and may generate an infrared or near infrared laser beam or line or plane (such that the laser lines may not be readily viewable by a person observing the area in front of the vehicle tires but would be detectable by the imager or camera, which typically is sensitive to light in the infrared and near infrared range of the electromagnetic spectrum).

Optionally, and desirably, a camera and laser line emitter may be provided at each front tire of the vehicle to detect surface irregularities in front of each tire of the vehicle as the vehicle travels along the road. The cameras or imaging sensors may comprise any suitable imaging sensor or device, such as one or more CMOS or CCD cameras or the like, such as the types described below.

The predictive suspension system 10 includes a micro processor or image processor 20, and may include a digital signal processor and peripheral circuitry and/or electronics, while remaining within the spirit and scope of the present invention. The image processor processes the captured images to detect the laser lines projected onto the road surface in front of the respective tire, and to determine a curvature in the laser line or lines emitted by the laser line emitter 18 to determine if there is a surface irregularity (such as a pothole or bump or road kill or object or the like) present in the area in front of the vehicle tire that is imaged by the camera. Such as detected curvature is due to the offset camera viewing the pothole or depression or bump at the road surface whereby the linear laser segment or segments are viewed as curved as the laser light pattern follows the contours of the road surface being imaged.

Figure 2B:
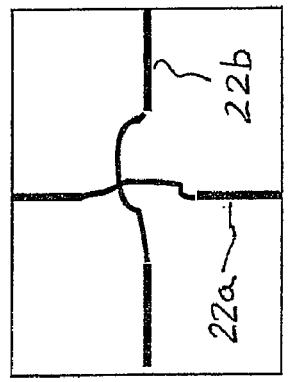
FIG. 2B is a schematic of an image captured by the imaging device of the predictive suspension system of FIG. 1 when there is a detectable surface irregularity imaged.
Figure 2A:
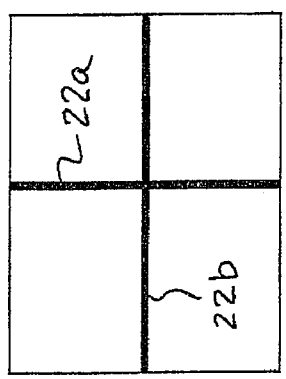
FIG. 2A is a schematic of an image captured by an imaging device of the predictive suspension system of FIG. 1 when there is no detectable surface irregularity imaged.

For example, and as can be seen with reference to FIGS. 1, 2A and 2B, the camera 16 (which is ahead of the tire and offset inboard and toward a centerline of the vehicle from a centerline of the tire 14b) captures images of the road surface in front of the vehicle tire 14b. When the laser line emitter 18 is activated and when the road surface in front of the tire is generally flat, the camera images the intersecting laser lines 22 as straight or substantially straight lines (such as shown in FIG. 2A), with one laser line 22a extending generally vertically across the captured image and the other laser line 22b extending generally horizontally across the captured image. When a bump or pothole or road kill or other object or surface irregularity is present in the imaged area in front of the vehicle tire, the laser lines in the captured image appear as curved or discontinuous lines (such as shown in FIG. 2B) at the surface irregularity, due to the offset or angle of the camera relative to the laser lines and road surface being imaged.

For example, and as can be seen with reference to FIGS. 1 and 2B, a pothole 12a is detectable by the determination by the image processor that the vertical laser line 22a is curved inward (or to the right in the captured image of FIG. 2B, but could be to the left for a camera offset outboard of the centerline of the tire or for an inboard camera and laser line emitter disposed at the right side vehicle tire) and the horizontal laser line 22b is curved upward. Alternately, a bump would be detected by detecting the laser lines curving in the opposite directions. As can be seen in FIG. 2B, the vision system allows for measurement of the entire pothole, and the depth or height of the surface irregularity can be determined or calculated since the angle of the camera (toward the road surface) is known, whereby the degree of curvature or offset of the laser lines in the horizontal or vertical direction can be used to determine or calculate the depth or height of the surface irregularity. Alternately, the height or depth of the bump or pothole may be determined by the number of pixels that the curved portion of the lines are offset from the straight line pixels.

Although illustrated as a cross-hair pattern having two line segments intersecting around a central region of the field of view, it is envisioned that the laser line light pattern of the detection system of the present invention may be otherwise configured, such as, for example, a grid pattern having multiple intersecting line segments, such as one or more horizontal line segments and one or more vertical line segments intersecting one another, or other line pattern or configuration, while remaining within the spirit and scope of the present invention. Optionally, the laser line grid pattern or cross-hair pattern desirably has a width (as projected on the road surface) that is wide enough to encompass the tire width and a length (as projected on the road surface) that is long enough to encompass the distance of travel of the vehicle over a specified time period, with the specified time period being at least as long as the time interval between successive captured frames of the imager. Thus, the frame capture rate of the imager is set so that a road surface irregularity will be detected in front of the vehicle and that the time between two captured frames will not be great enough to allow a road surface irregularity to pass through the imager's field of view undetected. Optionally, and desirably, the frame rate may be set at a higher rate to ensure the capturing of images with the cross-hair or grid pattern being at multiple locations along the road surface irregularity as the vehicle passes over the road surface irregularity.

Thus, the camera is operable to capture images of the area in front of the vehicle tire, such as about 1 meter (or other distance depending on the particular application) in advance of the tire to road contact region 12b. With such an arrangement, the camera images the road surface about 35 ms in advance of the tire when the vehicle is traveling at about 100 kph. When the predictive suspension system detects a surface irregularity, a signal or input may be generated or communicated to an active suspension system or the like responsive to an output signal from the signal processor.

Optionally, and with reference to FIGS. 3, 4A and 4B, a predictive suspension system or module 110 of the present invention includes an imaging sensor or camera 116 and an energy emitter or laser line emitter 118. Camera 116 is disposed at a forward portion 114a of the vehicle 114 and has a generally downward and forward field of view so as to encompass an area that is forward of the vehicle and in line with a tire 114b of the vehicle and in the direction of travel of the vehicle. Similar to camera 16 of system 10, discussed above, camera 116 is offset inboard of the centerline of the tire 114b, and has its forward field of view generally downward and forward of the tire so as to encompass an area forward of the tire's path of travel. Likewise, similar to laser line emitter 18 of system 10 discussed above, laser line emitter 118 is arranged generally inline with the centerline of the associated tire and is directed forwardly along the forward path of travel of the vehicle and the tire and generally downward so as to generate a laser line along the road surface in front of the vehicle and in line with the path of the tire (and at the area encompassed by the camera's downward and forward field of view).

For example, and as can be seen with reference to FIGS. 3, 4A and 4B, the camera 116 (which is ahead of the vehicle and tire and offset inboard and toward a centerline of the vehicle from a centerline of the tire 114b) captures images of the road surface 112 in front of the vehicle tire 114b. When the laser line emitter 118 is activated and when the road surface in front of the tire is generally flat, the camera images the intersecting laser lines 122 as straight or substantially straight lines (such as shown in FIG. 4A), with one laser line 122a extending generally vertically across the captured image and the other laser line 122b extending generally horizontally across the captured image. When a bump or pothole or road kill or other surface irregularity 112a is present in the imaged area in front of the vehicle tire, the laser lines in the captured image appear as curved or discontinuous lines (such as shown in FIG. 4B) at the surface irregularity, due to the offset or angle of the camera relative to the laser lines and road surface being imaged, similar to the images captured by camera 16, discussed above. Because the camera 116 is angled forwardly so as to capture images of a road surface area forwardly of the vehicle, the vertical line 122a may be discontinuous at the region of the pothole that is closest to the vehicle (and alternately may be discontinuous at the region of a bump that is farthest from the vehicle) due to the angle of the camera and laser line emitter relative to the road surface. Optionally, the predictive suspension system 110 may include a narrow infrared (IR) band-pass filter at the imager or camera 116 to reduce noise in the captured images.

In the illustrated embodiment, the image sensor or camera 116 is disposed at a level below (and inboard of) the laser line emitter 118. The angles of the laser line emitter 118 and camera's field of view may be selected such that the camera captures images of a road surface area that is about 3 meters (but could be more or less depending on the application) in advance of the tire to road contact region 112b. With such an arrangement, the camera images the road surface about 100 ms in advance of the tire when the vehicle is traveling at about 100 kph.

Thus, and as can be seen in FIG. 4B, the vision system or predictive suspension system allows for measurement of a substantial portion or most of the pothole, and the depth or height of the surface irregularity can be determined or calculated in a similar manner as described above. Because both the imager or camera and the laser line emitter may be disposed at the forward portion or front of the vehicle, it is envisioned that the predictive suspension system may be provided as a unitary module 124 at the forward portion of the vehicle, whereby electrical connections may be made to the module to connect the module to power and/or communications networks and the like. Predictive suspension system 110 may be otherwise substantially similar to predictive suspension system 10, discussed above, such that a detailed discussion of the predictive suspension systems need not be repeated herein.

Optionally, and with reference to FIGS. 5, 6A and 6B, a predictive suspension system or module 210 of the present invention includes an imaging sensor or camera 216 and an energy emitter or laser line emitter 218 at or in line with each of the two front tires 214b of a vehicle 214. Camera 216 is disposed at an upper region of the vehicle cabin (such as at or in or associated with an interior rearview mirror assembly of the vehicle or a windshield electronics module or accessory module of the vehicle, and with its forward field of view through the windshield of the vehicle) and has a generally forward field of view so as to encompass an area that is forward of the vehicle, including areas that are forward and in line with the tires 214b of the vehicle. Camera 216 is thus generally centrally positioned at or near or along a centerline of the vehicle and thus is offset inboard of the centerlines of the tires 214b and inboard of the laser line emitters 218.

Similar to laser line emitter 18 of system 10 discussed above, each laser line emitter 218 is arranged generally inline with the centerline of the associated tire and is directed forwardly along the forward path of travel of the vehicle and the tire and generally downward so as to generate a linear pattern of illumination or energy or a laser line along the road surface in front of the vehicle and in line with the path of the tire (and at the area encompassed by the camera's downward and forward field of view). In the illustrated embodiment, the laser line emitters 218 are located at a forward portion 214a or front portion of the vehicle 214, but could be located at or near the tires (similar to laser emitter 18, discussed above), with the laser lines being emitted forwardly of the vehicle so as to be at a road surface area sufficiently forward of the vehicle so as to be within the forward field of view of the camera 216.

Figure 6D:
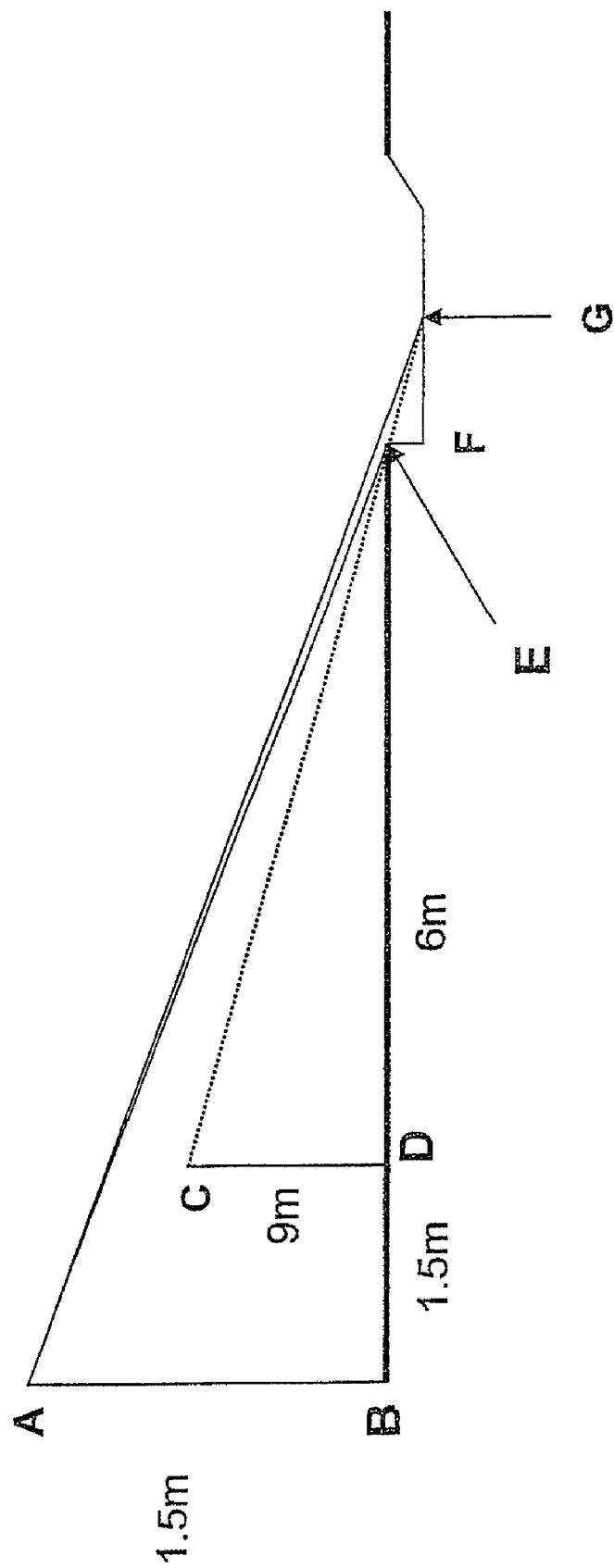
FIG. 6D is a schematic of the imaging system of FIG. 5, showing the distances and angles of the imager and laser emitter relative to the road surface in front of the vehicle.

As can be seen with reference to FIGS. 5, 6A and 6B, the camera 216 captures images of the road surface 212 in front of the vehicle. When the laser line emitter 218 is activated and when the road surface in front of the tires is generally flat, the camera images the intersecting laser lines 222 of each laser line emitter 218 as straight or substantially straight lines (such as shown in FIG. 6A), with a laser line 222a at each side or tire extending generally upward and toward the focal point of expansion of the captured image and the other laser line 222b at each side or tire intersecting the respective laser line 222a and extending generally horizontally across a respective portion of the captured image. When a bump or pothole or road kill or other surface irregularity 212a is present in the imaged area in front of the vehicle tire, the laser lines in the captured image appear as curved or discontinuous lines (such as shown in FIG. 6B) at the surface irregularity, due to the offset or angle of the camera relative to the laser lines and road surface being imaged, similar to the images captured by camera 16, discussed above. Because the camera 216 is directed forwardly so as to capture images of a road surface area forwardly of the vehicle, the lines 222a may be discontinuous at the region of the pothole that is closest to the vehicle (and alternately may be discontinuous at the region of a bump that is farthest from the vehicle) due to the angle of the camera and laser line emitter relative to the road surface. Likewise, because of the generally central location of the camera and the corresponding angle toward the side regions in front of the vehicle, the lines 222b may be discontinuous at the region of the pothole toward the center of the path or road surface. In a similar manner as discussed above, the depth or height of the surface irregularity can be determined or calculated via the geometrical arrangement of the components and/or via the pixel displacement of the detected linear pattern of energy or laser lines. For example, in the illustrated embodiment of FIGS. 5, 6A and 6B, a two inch deep pothole would be represented in the captured image with a curved line 222a that is about 4 pixels offset from the straight line pixels, assuming that the tires are about 1.6 meters apart, and assuming the other dimensions shown in FIG. 6D. Optionally, the predictive suspension system 210 may include a narrow infrared (IR) band-pass filter at the imager or camera 216 (such as at the two areas or portions of the imager that capture the image of the laser cross-hairs) to reduce noise at least at the pothole or bump detection region or portion of the captured images. Optionally, to overcome ambient daytime light during daytime operation of the system, the system may activate or pulse an infrared or near infrared laser line (such as a laser line having wavelength of about 920 nm or thereabouts) and capture images with and without the laser line activated, and may subtract image characteristics or intensities of captured images without the laser line from image characteristics or intensities of captured images having the laser line pulsed during image capture to obtain a clean laser line image.

In the illustrated embodiment, the image sensor or camera 216 is disposed at a level above (and inboard of) the laser line emitter 218, such as at an upper region of the vehicle windshield, and preferably with its field of view through the vehicle windshield and through an area that is swept and cleaned by the vehicle windshield wipers. The angles of the laser line emitter 218 and camera's field of view may be selected such that the camera captures images of a road surface area that is about 6 meters (but could be more or less depending on the application) in advance of the tire to road contact region 212b. With such an arrangement, the camera images the road surface about 200 ms in advance of the tire when the vehicle is traveling at about 100 kph. Because the camera's field of view encompasses the area forward of the vehicle and toward the horizon, the predictive suspension system may detect bumps or potholes in advance of the location of the laser lines (as the vehicle approaches the pothole or bump), such as via other image processing, and may adjust the image capture frame accordingly so as to time the frame capture of the camera to capture an image of the bump or pothole when the laser lines are at the bump or pothole.

Thus, and as can be seen in FIG. 6B, the vision system or predictive suspension system allows for measurement of a substantial portion or most of the pothole, and the depth or height of the surface irregularity can be determined or calculated in a similar manner as described above. For example, with the laser cross-hairs or grid pattern at about 6 meters in advance of the tire-road interface, a two inch (or thereabouts) deep pothole would be represented by about a 1 pixel displacement of the transverse line in the captured image, although such pixel displacement may vary depending on the type of imaging device (such as pixel resolution or the like) and/or the mounting location and angle of the imaging device or laser emitter and/or the like. The laser line emitters may be disposed at or near the respective vehicle headlamps, or may be positioned elsewhere at or near a forward region or portion of the vehicle. Predictive suspension system 210 may be otherwise substantially similar to predictive suspension systems 10 and 110, discussed above, such that a detailed discussion of the predictive suspension systems need not be repeated herein.

Optionally, it is envisioned that an output of or image data captured by the camera or imaging device 216 of predictive suspension system 210 may be used in conjunction with other vision-based systems of the vehicle, such as, for example, an automatic headlamp control system, a lane departure warning system, an object detection system, and/or the like. The captured image data (as captured by the camera 216 at or near or associated with the interior rearview mirror assembly or windshield electronics module or accessory module of the vehicle) may be processed (such as by the image processor of the predictive suspension system or by another image processor) to extract other information therefrom. For example, and with reference to FIG. 6C, the captured image data may be processed to extract information or data indicative of headlamps 226a of oncoming or approaching vehicles (typically white light sources forward of and to the left of the controlled vehicle), or taillights 226b of leading vehicles (typically red light sources forward of the controlled vehicle), or lane markers 226c (typically white or yellow markers arranged along the road surface) or the like. The processor or processors may generate an output indicative of a detection of the objects or illumination sources or markers of interest, whereby the headlamps of the controlled vehicle may be adjusted or controlled accordingly (such as in response to a detection of another vehicle in front of the controlled vehicle) or the steering system or alert system of the controlled vehicle may be adjusted or controlled accordingly (such as in response to a detection of the vehicle departing its lane or the like) or the like. Thus, the predictive suspension system may share or access components or circuitry or the like (such as a camera and/or image processor) with other vision-based systems.

With reference to FIG. 6D, for a typical sport utility vehicle or SUV, and with the laser emitter 218 near the vehicle headlight and the imaging device 216 generally at or near the vehicle windshield, a road surface irregularity or hole 212a may be detected about 6 meters in front of the vehicle. In the illustrated schematic of FIG. 6D, if a pothole 212a is about 6 m from the front of the vehicle (and thus about 7.5 meters forward of the imaging device), the imaging device detects the laser line at different angles depending on whether or not a hole or bump is present about 6 meters in front of the vehicle. For example, for a two inch deep pothole, the imaging device may detect the laser lines or cross-hairs at a downward angle of about 11.19 degrees (or other angle depending on the particular application of the system), whereas the imaging device may detect the level road surface at a downward angle of about 11.31 degrees (or other angle depending on the particular application of the system). The difference between the angles may be calculated by the equation:

$$A\tan(AB/BE) - A\tan((AB+EF)/(BE+(EF*DE/CD))),$$

which is represented by more than a 1 pixel difference on a typical 480×640 VGA size imager or the like (and which may have about a 45 degree horizontal field of view). Optionally, structured light algorithms may be utilized to measure the angles and offsets to sub-pixel accuracy.

Figure 7A:
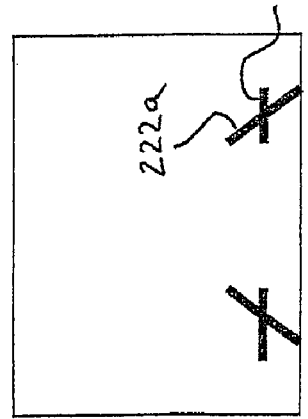
FIGS. 7A-C are schematics of images captured by the imaging device of the predictive suspension system of FIG. 5.
Figure 7B:
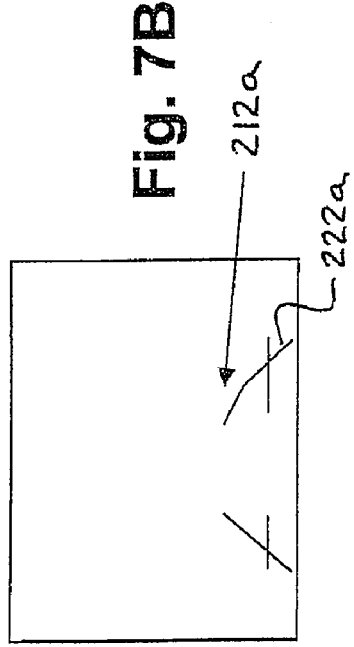
Figure 7C:
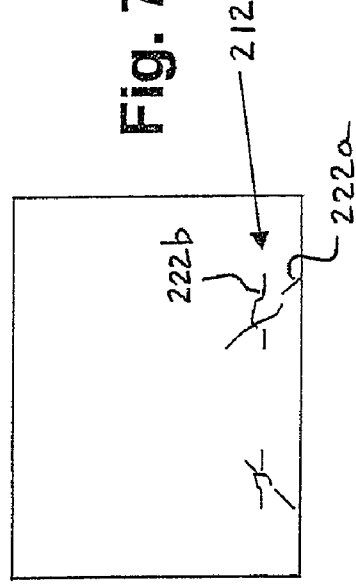

Thus, the captured image data of the predictive suspension system of the present invention may be processed to determine when the vehicle is approaching a surface irregularity in the road in front of the vehicle's tire or tires. The system may provide an early detection or warning of an approaching surface irregularity, and may be operable to time subsequent image frames and/or laser actuations in response to such advance detection. For example, and with reference to FIGS. 7A-C, an initial frame (FIG. 7A) captured by the imaging device 216 may not indicate any detectable or significant surface irregularity in front of the vehicle. A second or subsequent frame (FIG. 7B) captured by the imaging device 216 may indicate that a surface irregularity 212a is initially detectable ahead of the laser cross-hair configuration, such as by detecting a curvature in the vertical (extending upward toward the focal point of expansion of the captured image) laser line 222a or by otherwise detecting a surface irregularity in advance of the laser cross-hair location. When such a surface irregularity is detected, the system may use such information to time the next frame capture (FIG. 7C) to ensure capturing an image of the road surface at a time when the surface irregularity 212a is substantially at and preferably substantially centered at the laser cross-hairs 222a, 222b to obtain an enhanced or optimal profile of the surface irregularity. Optionally, the laser cross-hairs may also be activated or pulsed at the appropriate time to correspond with the image capture or frame capture to enhance imaging of the surface irregularity. The system thus provides an early detection of a future or expected or anticipated surface anomaly and targets or adjusts the frame or image capture to capture an image of the road surface when the cross-hairs encompass the surface anomaly to provide an enhanced hole or bump profile.

Thus, the in-path far or forward end of the laser line may indicate an approaching distortion, with the length of the laser line being selected so as to be sufficiently long to show road surface distortion in advance of the cross-hair or grid pattern or transverse laser line. Also, the frame capture rate of the imaging device is preferably selected to be high enough to capture images of the surface anomaly along the laser in-path line and when the surface anomaly is at the cross-hairs. For example, if the laser in-path line is projected so as to be about 3 meters long when projected along the road surface in front of the vehicle, the frame rate may be about 9 frames per second (when the vehicle is traveling at about 100 kph) to capture frames or images of the distortion along the laser line and when the distortion is at the cross-hairs.

The location of the distortion along the in-path laser line thus may be used to estimate when the orthogonal transverse line or cross-hair or horizontal line or intersecting line will be at or on top of the distortion, so that the imaging device may capture an image at that time to enhance detection and analysis of the surface anomaly or distortion. The system may also provide timing analysis for the transverse line image (including in-path laser lines in front of both tires of the vehicle) to detect details of distortions or surface anomalies in the paths of both tires. If dual in-path distortions are detected, such distortions may be indicative of a full lane of distortion in front of both tires of the subject vehicle. The detection of the anomaly and/or details thereof may be communicated to an active suspension system to indicate the location of the surface anomaly and optionally the area and depth or height of the hole or bump and a confidence rating of the measured or detected data, whereby the active suspension system may control the vehicle suspension at the appropriate time in response to the anomaly detection. Optionally, the early detection of a surface anomaly may be communicated to closer-range detection systems or devices (such as those described above with respect to FIGS. 1 and 3) to provide further detection and analysis of the detected surface anomaly, as discussed below.

Optionally, and desirably, the early detection of a surface anomaly may be communicated to the active suspension system or suspension control system to provide sufficient time for the suspension control system to prepare to react to the approaching detected anomaly. For example, the suspension control system may pre-energize or pre-pressurize or pre-charge an actuator system of the suspension system in response to an alert or signal or communication indicative of a detection of a road surface anomaly or irregularity as detected by an advance detection system. Thus, the advance detection of a surface anomaly may assist in preparing the active suspension system to respond to the closer detection systems so as to provide enhanced reaction time and performance of the active suspension system.

Optionally, and with reference to FIGS. 8, 9A and 9B, a predictive suspension system or module 310 of the present invention includes an imaging sensor or camera 316 disposed at an upper region of the vehicle cabin (such as at or in or associated with an interior rearview mirror assembly of the vehicle or a windshield electronics module or accessory module of the vehicle, and with its forward field of view through the windshield of the vehicle) and with a generally forward field of view so as to encompass an area that is forward of the vehicle 314, including areas that are forward and in line with the tires 314b of the vehicle. The imaging sensor 316 is operable to capture images of the road surface in front of the vehicle, and the captured image data may be processed (such as via an edge detection algorithm or other suitable processing technique) to detect and discern surface irregularities in the road surface in front of the vehicle. The predictive suspension system 310 may be operable in a passive or daytime operating mode (with no additional illumination source activated to illuminate the road surface in front of the vehicle) or a nighttime operating mode (optionally with the vehicle headlamps 314b or an additional illumination source, such as a near infrared light emitting diode or the like, operable to direct illumination toward the road surface 312 in front of the vehicle).

For example, and with reference to FIGS. 8 and 9A, the imaging device 316 may capture images of the scene forwardly of the vehicle, and the system may process the captured image data to detect and discern objects (such as leading vehicles 326b and approaching vehicles 326a) or road surface irregularities 312a in front of the vehicle and in the forward field of view of the imaging device. The system may use any suitable machine vision processing technique to determine and discern distortions or irregularities or anomalies in the captured image data. For example, the system may detect distortions or anomalies in the movement of the vehicles (such as a leading vehicle 326b) detected ahead of the subject vehicle. The system may function to detect movement of the vehicle 326b in front of the subject vehicle, since such movement may be indicative of the leading vehicle encountering surface irregularities or distortions along the road surface. As can be seen in FIG. 9A, the system may determine a predictive path of the leading vehicles (such as shown as dashed arrows in FIG. 9A), and the system may analyze the image data to determine the vibrations or movements of the leading vehicle or vehicles (that may be indicative of the leading vehicle driving over or into a surface irregularity) and/or other movements of the vehicle or vehicles ahead of the subject vehicle (such as non-predictive movements of the leading vehicle, such as deviations from the predictive path that may be indicative of swerving or the like, and that may be indicative of a road surface irregularity such as a pothole or object or road kill or the like ahead of the vehicle).

The passive system may also be operable to detect a road surface distortion in front of the vehicle. For example, the road surface distortions or irregularities may also be detected via image processing of the frames following the frames that captured the movement or vibration of the vehicle, such as when the surface anomaly becomes visible at the road surface after the leading vehicle has passed over the surface anomaly. The distortions in the road surface may be detected by color and/or reflectance changes on the road surface (although such changes may be due to paint or other surface changes). Such distortions may be detected in front of the subject vehicle, such as about 6 m to about 20 m ahead of the subject vehicle. The system may use speed and/or distance estimates to track a detected or predicted road anomaly as the subject vehicle approaches the road anomaly, and/or may track the anomaly until a more accurate detection system (such as the closer range detection systems described above with reference to FIGS. 1-5) can determine the characteristics of the road surface anomaly (such as a bump or a hole or road kill or the like) and can relay such detection to the active suspension system for corrective or responsive action by the suspension system before the tire-road interface 312b is at the detected road anomaly or surface irregularity.

Optionally, and as shown in FIG. 9B, the system may be operable in a nighttime mode and may detect the leading taillights 326b' and oncoming headlights 326a' of other vehicles present in the forward field of view of the imaging device. Optionally, when the system is operating in such a nighttime (such as in response to a detection of an ambient light level being below a threshold level), the system may activate an illumination source (such as a vehicle headlamp 314b or other auxiliary illumination source) to provide illumination at the road surface in front of the vehicle to assist in detection of road surface anomalies. Optionally, and desirably, if such an auxiliary illumination source is utilized, the illumination source may emit infrared or near infrared energy (and the imaging device is preferably sensitive to such infrared or near infrared energy) such that the energy is detected by the imaging device is not readily noticeable or discernible by the driver of the vehicle.

Thus, the system may process the image data to detect a leading vehicle, such as a leading vehicle in the same lane as the subject vehicle (detection of oncoming vehicles 326a in adjacent lanes is not as helpful since the vehicle is in a different lane and it is difficult to detect distant vibrations), and to determine the relative and relevant movement of the vehicle. The system may process image data of leading vehicles to determine if a vibration or movement pattern or signature of the leading vehicle (or taillights of the moving vehicle) is indicative of the vehicle encountering a bump or hole in the road or road kill or other object on the road. Because such processing may be compromised by vibration or movement of the subject vehicle as well, the system may optionally adjust the processing in response to a detected vibration or movement of the subject vehicle to account for such subject vehicle vibration. Optionally, and desirably, the system may capture the frames or images at a fast enough frame rate to determine the vibration of the leading vehicle as it hits or encounters the surface irregularity. Optionally, and desirably, the system may utilize a distance estimation of distance between the detected surface irregularity and the tire to road interface, and may relay information to an in-path laser line and imaging device to alert the closer range system or systems (such as a system of the types described above) of an approaching surface irregularity.

When the system is operating in a nighttime mode, the system may utilize aspects of an automatic or intelligent headlamp control system or other forward viewing camera system to detect vibrations and failed predictive movement of the taillights of a leading vehicle (or optionally the headlamps of an approaching vehicle) to detect and discern an approaching road surface anomaly or irregularity. Because the subject vehicle may be in the same lane as the detected taillights, detected distortions or non-predictive movements of taillights are processed for surface irregularity detection and for providing information to the close range sensors or sensor system. Thus, such detected taillight movement may be relayed to later active stages or systems (such as closer range laser line systems of the types described above), along with relevant time and relative vehicle speed so that the close range imaging device captures frames when the detected or estimated distortion or anomaly is in the range of or encompassed by the laser lines.

Thus, the system may be operable to detect the headlamps of oncoming vehicles, and may detect intensity fluctuations of the detected headlamps (which may be indicative of vibration since headlamps are directional light sources and vibration effects may be amplified due to the headlamp aiming), since detection of actual light movement may be very slight at larger distances. The system may detect movement or vibration of detected headlamps of oncoming vehicles in the forward field of view of the imaging device, such as at up to about 100 to 200 m ahead of the subject vehicle. At about 100 kph travel speed of the subject vehicle, the detected road anomaly may be only about 4 to 8 seconds ahead of the subject vehicle. Because the subject vehicle is not typically in the same lane as the detected headlamps, it is envisioned that only severe detected distortions or non-predictive motions are processed for surface irregularity detection and for providing information to the close range sensors or sensor system. Thus, such detected headlamp movement is likely only relevant when indicative of a full road involvement by the detected oncoming vehicle.

Likewise, the system may be operable to detect vibration signatures of detected taillights of leading vehicles to obtain a prediction of a road surface anomaly in the road ahead of the subject vehicle. Because taillights have a lower intensity as compared to headlamps, the imaging device may have less range for detecting taillights as compared to headlamps, but the subject vehicle can follow the leading vehicle for a longer period of time to enhance imaging of the taillights and detection of vibrations or taillight movement. With taillight detection, the movement or vibrational distortions may be detectable instead of intensity fluctuations, since taillights are typically non-directional light sources. The detected vibration signatures may depend on the suspension of the leading vehicle and the range to the leading vehicle and the surface anomaly or signature.

Optionally, the predictive suspension system of the present invention may utilize a long range image capturing device (such as imaging device 216) and a shorter range image capturing device (such as imaging device 116 and/or imaging device 16) to provide a multi-stage system operable to detect anomalies or irregularities at multiple distances in front of the vehicle and/or the vehicle's tires. Such a multi-stage system may provide enhanced detection and analysis of surface irregularities over a single resolution system. The imaging devices may be directed to relevant anomalies at many distances. For example, a far range may be used to detect substantial surface irregularities, such that the irregularity is detected more than a second before the vehicle tire impacts the irregularity.

For example, the imaging device 216 (or 316) may detect a road surface irregularity in front of the vehicle and the predictive suspension system may utilize the information data gathered from the distance imaging device to predict the location of the surface irregularity as the vehicle approaches the irregularity. The system thus may predict the timing and location of the detected surface irregularity for image acquisition by and/or illumination at the closer imaging devices (such as imaging device 116 and/or 16). The system thus may output information responsive to the far range detection to later or closer-range states or imagers, where the output information is used to predict the timing and location of the irregularity for enhanced image acquisition and illumination, and to produce a final more accurate prediction for the active suspension system and/or other automatic or semi-automatic control systems and/or alert systems (such as for alerting the driver of an approaching surface irregularity or the like) or the like.

Figure 10A:
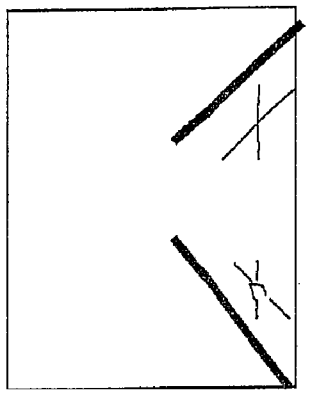
FIGS. 10A-C are schematics of images captured by the imaging devices of a multi-stage predictive suspension system of the present invention.
Figure 10B:
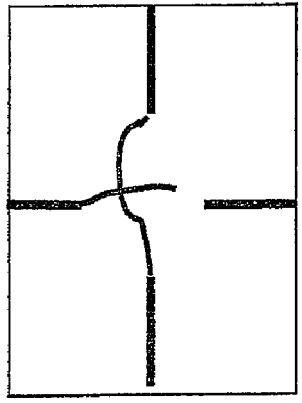
Figure 10C:
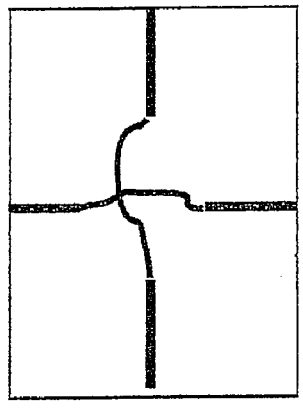

For example, and as can be seen with reference to FIGS. 10A-C, the predictive suspension system of the present invention may utilize a long range imaging system to capture images of the road surface in front of the vehicle (FIG. 10A), such as via imaging device 216 or 316, discussed above. As can be seen in FIG. 10A, the image indicates a surface irregularity along the left side of the lane and in the predicted path of the left tire of the vehicle. Thus, the detection of such a surface irregularity may be alerted or communicated to a closer range system or imaging device, whereby the closer range imaging device captures images (FIG. 10B) of the road surface closer to the vehicle tire, such as about 3 meters in front of the vehicle tire, such as by using imaging device 116, discussed above. The detection of such a surface irregularity may also or otherwise be alerted or communicated to a close range system or imaging device, whereby the closer range imaging device captures images (FIG. 10C) of the road surface immediately in front of the vehicle tire, such as about 1 meter in front of the vehicle tire, such as by using imaging device 16, discussed above. The system of the present invention thus may detect the presence of a surface anomaly, and may conduct further processing to confirm the presence of the surface anomaly and to measure the size (such as area and/or height or depth) of the surface anomaly as the vehicle approaches the detected surface anomaly.

Optionally, and in addition to informing the suspension control system of a detection of a bump or pothole or the like a certain time and/or distance ahead of the vehicle or vehicle tire, the machine vision system or detection system of the present invention may measure a profile or curve of the bump or pothole and inform the suspension control system of the measured profile, such as a height/depth versus time profile or a height/depth versus distance profile. Such a profile may be more accurately measured by a laser line pattern projected close to the subject vehicle, such as at about 1 m or 3 m or 6 m in advance of the vehicle or vehicle tire. Given such a profile, the active suspension system may control a suspension actuator to follow the profile at the right timing, so that the impact and vibration of the subject vehicle may be substantially reduced or substantially eliminated as the vehicle travels over the detected bump or pothole or object or the like. Optionally, the imaging device of a closer range detection device or system may be operable to capture frames or images at a higher frame rate when a bump or pothole or object is detected by an advance or farther range detection system so that an enhanced profile of the bump or hole or object may be captured or determined as the closer range imager images the road surface at the bump or hole or object as the vehicle or vehicle tire approaches the bump or hole or object.

Because known active suspension controls may use a sensor that provides real time height error as a feedback signal and that may control the actuator to minimize the error, such known reactive controls may require sophisticated closed-loop controls and a high powered microprocessor or digital signal processor. Optionally, an active suspension control system that is responsive to the detection system of the present invention may be provided with a continuously or substantially continuously measured profile of the road in front of the vehicle tire, whereby the suspension control may buffer the profile and output a control signal to the suspension actuator at the right timing and thus as the vehicle tire encounters and travels over the detected and profiled road surface. The suspension control thus may not require the sophisticated and costly closed-loop control mechanism to adjust or control the vehicle suspension as the vehicle travels over a detected bump or pothole or object. Thus, the cost of the suspension control system may be reduced when implemented in conjunction with the detection system of the present invention.

The distances forward of the vehicle where the images are captured by the respective imaging devices may be selected based on anticipatory response time periods. For example, some systems (such as suspension systems) may require only about 15 ms (about 0.5 m at about 100 kph) advance information to react and/or to be controlled appropriately, while other systems may require about 1 second advance information (about 27 m at about 100 kph). For example, a fast linear motor (such as a continuously variable road-sensing suspension on some commercial vehicles) may be able to react within 13 ms and thus may be responsive to an input from the 1 m range sensor, while other suspension systems (such as an active cornering enhancement (ACE) on some commercial vehicles) may be operable to, for example, counteract a lateral 1 g acceleration within 250 ms and thus may be responsive to an input from the 6-7 m range sensor. Outputs of other detection stages or ranges may also or otherwise help an active suspension partially react to a detected road distortion. The multi-stage system may provide an early detection and early notice/alert system, while providing a later confirming detection and/or a later more detailed detection (such as size and/or depth or height of the surface irregularity) with the closer stage or stages.

The timing of the image capture, image processing and communication indicative of a detected surface anomaly to the active suspension system should be less than suspension reaction time from detection time, so that the suspension system has time to receive the communication and respond accordingly before the vehicle tire impacts the detected anomaly. For fast response suspension systems, any of the ranges or stages (such as the 7 m, 3 m or 1 m stages) may be used depending on the particular application and cost constraints and accuracy parameters, while for slower suspension systems, the longer range stage or stages (such as the 7 m stage or the 3 m stage) may be used depending on the particular application and cost constraints and accuracy parameters. For example, for a system with about a 100 ms suspension reaction time, a detection system may have an imaging device with a capture time of about 16 ms (such as for a 60 frame per second camera or the like), an image processing time of about 16 ms, a communication time of about 30 ms (such as via a CAN communication bus or the like), which is less than the reaction time (100 ms) of the suspension system.

The present invention thus provides a multi-stage or multi-scale detection system for a predictive suspension system and thus provides multi-scale resolution of the detected surface anomalies in front of the vehicle. For example, a long range detection system may detect surface anomalies on the order of tens of meters in front of the vehicle may detect vehicles during daytime operating conditions and taillights (or headlights) of vehicles during nighttime operating conditions, and may share or access components and/or circuitry (such as a common imaging device or camera) with another forward facing vision-based system, such as an automatic headlamp control system, a lane departure warning system, a collision avoidance system and/or the like. One or more closer range detection systems may be operable to detect and analyze a surface irregularity as it approaches the vehicle. For example, for detection of anomalies at or within about 7 meters from the tire to road interface, an active laser line detection system may be operable to detect anomalies at particular distances in front of the tire to road interface, such as at about 6-7 meters in front of the tire to road interface, about 3 meters in front of the tire to road interface, and/or about 1 meter in front of the tire to road interface. Depending on the particular application (such as depending on the system cost constraints, the type of vehicle and/or the vehicle suspension type and/or the like), various combinations of the long and short range detection systems may be implemented while remaining within the spirit and scope of the present invention.

For example, a detection system may include a passive detection system that detects a road surface anomaly about 20 meters or more in front of a vehicle or vehicle tire-road interface (providing an advance detection of about 1000 ms or more before impact for a vehicle traveling at about 100 kph), and/or a windshield electronic module or laser line detection system that detects the road surface anomaly about 6 to 7 meters in front of the vehicle or vehicle tire-road interface (providing an advance detection of about 200 ms before impact for a vehicle traveling at about 100 kph), and/or a triangulation or laser line detection system that detects the road surface anomaly about 3 meters in front of the vehicle or vehicle tire-road interface (providing an advance detection of about 100 ms before impact for a vehicle traveling at about 100 kph), and/or a triangulation or laser line detection system that detects the road surface anomaly about 1 meter in front of the vehicle or vehicle tire-road interface (providing an advance detection of about 35 ms before impact for a vehicle traveling at about 100 kph). After the closest detection, the front wheel of the vehicle will impact the detected anomaly and then the rear wheel will impact the detected anomaly about 100 ms after the front wheel impact (for a vehicle that has about a 3 meter wheelbase or thereabouts). Optionally, each of the detection stages may provide a prediction or alert of a detected surface anomaly to the active suspension system of the vehicle. The accuracy of the predictions and the confidence of accurate detection of a road surface anomaly will increase as the detected anomaly or item gets closer to the vehicle.

Optionally, the longer-range passive detection system may also or otherwise provide an alert to the driver of the vehicle, such as to a human machine interface of the vehicle (such as via an audible alert, a haptic alert (such as a vibration of the steering wheel or seat or the like), a visual alert (such as an iconistic alert or indicator alert or the like at a display area viewable by the driver of the vehicle, such as at the interior rearview mirror assembly or an accessory module or the like of the vehicle) or other suitable alert device or system) to alert the driver of the vehicle that the vehicle may be approaching a road surface anomaly. Such advance warnings may be communicated to an alert device and to the driver of the vehicle via any suitable communication protocol, and may be communicated to other vehicles or systems remote from the vehicle, such as via an inter-vehicle communication or a broadcast communication or the like. Such advance warning systems thus may provide the driver of the vehicle with about a 1 second advance alert, giving the driver about 1 second to react to the detected anomaly, and/or may provide the active suspension system with about a 15 ms to 1000 ms advance alert.

Because such active detection systems (having a laser line illumination source or the like) have limited range for detecting roadway anomalies, the illumination source should be strong or intense enough to overcome ambient light even for narrow bandwidth wavelength source and detectors. Also, the frame capture rate should be sufficiently fast to capture the illuminated small area ahead of the vehicle, which may be moving relatively fast along the road surface. The laser line sources thus must be accurately timed or coordinated with the imaging device, since a vehicle traveling at about 100 kph will move about 0.5 m in a frame captured at a rate of about 60 frames per second at a range of less than or equal to about 7 meters in front of the vehicle or tire-to-road interface of the vehicle. Predictions from earlier or greater distance or anticipatory stages can make efficient use of the desired high frame rates and high processing loads of the more accurate short range stages by providing an estimate of where a detected road surface anomaly is in relation to the vehicle as the vehicle approaches the road surface anomaly.

It is envisioned that the orientation (tilt, pitch, yaw) of the subject vehicle may affect the system's ability to accurately detect and discern road surface anomalies or irregularities in front of the vehicle. Thus, the system optionally, and desirably, takes such vehicle orientation data into account when processing the captured image data. For example, the intensity and color of the laser lines and/or captured images should be minimally if at all affected by a change in vehicle orientation, while any triangulation distance measures may be affected by such a change in vehicle orientation. For example, the laser line signatures may be distorted depending on the degree of change in vehicle orientation. If some of the laser line signature is unaltered (or there is only a slight or little change in the size of the distortion at the road surface), then the system may assume that the laser line signature is not substantially affected and is thus acceptable without changing the processing of the image data. However, if the laser line signature is substantially changed or changed in its entirety, then the system may adjust the image processing to compensate for a detected change in the vehicle orientation and/or vehicle vibration. Such compensation methods for accommodating for vehicle tilt and vibration may include processing the captured images to determine the tilt of the vehicle by determining a focus of expansion point of the captured images (such as via detection of lane markers or the like) to determine the horizon and general vehicle heading. Optionally, the subject vehicle may include a multiple axis accelerometer that measures vibration and tilt of the vehicle, whereby data collection over time allows for conversion from acceleration to velocity to distance and orientation of the vehicle. The image processor thus may adjust the processing of the image data in response to a detected or determined tilt or change in orientation of the vehicle.

Optionally, the predictive suspension system of the present invention may also communicate with vehicle communication buses to receive vehicle information, such as status information of various vehicle systems or accessories or the like. For example, the predictive suspension system may receive information including, but not limited to, the current vehicle speed, the steering angle, an antilock brake system (ABS) status, an electronic stability control system status and/or the like. Optionally, the predictive suspension of the present invention may also send or communicate or output information that may be received by other systems of the vehicle. Such outputs may include, for example, a warning of the detection of surface irregularities on the road surface, a distance to the detected surface irregularity, an estimated time to reach the detected surface irregularity and the like. The predictive suspension system may also directly present or indicate a surface irregularity warning to the driver of the vehicle, such as via a light or lights, an audible signal or sound, a vibration or other tactile or haptic signal (such as a vibration of the steering wheel or the like), a voice signal, and/or the like, so that the driver is alerted to the detection of a surface irregularity, such as a bump or pothole that is higher or deeper than a threshold level. Optionally, the predictive suspension system may control one or more of the vehicle systems, such as the vehicle accelerator or braking system of the like, so as to assist the driver in avoiding the detected hazardous condition.

Optionally, and as discussed above with respect to predictive suspension system 210, the camera or cameras of the predictive suspension system can be mounted inside a vehicle, such as at the back of an interior rear view mirror assembly of the vehicle or other suitable places, such as at or in a windshield electronics module or accessory module at or near the interior rearview mirror assembly of the vehicle and at or near the windshield of the vehicle. In such locations, the imaging sensor or camera preferably has a forward field of view through the windshield of the vehicle and preferably through an area cleaned or wiped by a windshield wiper of the vehicle when the windshield wiper is activated. The forward facing camera and system may be positioned at or near or beside other forward facing sensor systems, or may be integrated with one or more other camera-based forward facing imaging or vision systems, such as systems for rain sensing or headlamp control or the like. Optionally, the forward facing camera and/or predictive suspension system may be mounted elsewhere at the vehicle, such as at or near or inside a forward facing lamp of the vehicle, such as a headlamp or fog lamp of the vehicle, while remaining within the spirit and scope of the present invention.

Optionally, the predictive suspension system of the present invention may include an illumination source to enhance imaging of the area forward of the vehicle tire in low lighting conditions. However, since the imager images the area that encompasses the laser line or lines (which may comprise visible light or infrared or near infrared light) and the processor processes the captured images to detect curves or irregularities in the laser line or lines, an illumination source is not necessary to allow the system to function in low light conditions, such as at nighttime. Optionally, the predictive suspension system may also be integrated with and share system resources with other forward facing systems, like LDW or AHBC, such as by controlling illumination and/or dividing frames and/or processing frames differently for different applications.

The predictive suspension system of the present invention thus may detect bumps or potholes or other surface irregularities in front of the tires of a vehicle and adjust or control the suspension system of the vehicle accordingly, and optionally may provide a warning or indication to the driver of the host vehicle that a large or substantial surface irregularity has been detected in front of the host vehicle. The predictive suspension system may include any imaging sensor or sensors, and may utilize aspects of various vision or imaging or detection systems, such as, for example, blind spot detection systems described in U.S. Pat. Nos. 7,038,577; 6,882,287; 6,198,409; 5,929,786; and/or 5,786,772, and/or U.S. patent application Ser. No. 11/239,980, filed Sep. 30, 2005; and/or Ser. No. 11/315,675, filed Dec. 22, 2005, and/or U.S. provisional application Ser. No. 60/638,687, filed Dec. 23, 2004; Ser. No. 60/628,709, filed Nov. 17, 2004; Ser. No. 60/614,644, filed Sep. 30, 2004; and/or Ser. No. 60/618,686, filed Oct. 14, 2004, and/or road surface detection systems, such as of the types described in U.S. patent application Ser. No. 11/948,086, filed Nov. 30, 2007, and U.S. provisional application Ser. No. 60/872,270, filed Dec. 1, 2006, and/or reverse or backup aid systems, such as rearwardly directed vehicle vision systems of the types described in U.S. Pat. Nos. 7,005,974; 5,550,677; 5,760,962; 5,670,935; 6,201,642; 6,396,397; 6,498,620; 6,717,610 and/or 6,757,109, and/or of automatic headlamp control systems of the types described in U.S. Pat. Nos. 5,796,094 and/or 5,715,093; and/or U.S. patent application Ser. No. 11/105,757, filed Apr. 14, 2005; and/or U.S. provisional application Ser. No. 60/607,963, filed Sep. 8, 2004, and/or rain sensors or rain sensing systems of the types described in U.S. Pat. Nos. 6,250,148 and 6,341,523, of other imaging or detecting systems, such as the types described in U.S. Pat. Nos. 6,353,392 and 6,313,454, and/or U.S. patent application Ser. No. 11/948,086, filed Nov. 30, 2007; Ser. No. 12/171,436, filed Jul. 11, 2008; and/or Ser. No. 12/190,698, filed Aug. 13, 2008; and/or U.S. provisional application Ser. No. 60/872,270, filed Dec. 1, 2006; Ser. No. 60/949,352, filed Jul. 12, 2007; Ser. No. 60/956,633, filed Aug. 17, 2007; and/or PCT Application No. PCT/US07/75702, filed Aug. 10, 2007; and/or PCT Application No. PCT/US08/78700, filed Oct. 3, 2008; and/or PCT Application No. PCT/US08/76022, filed Sep. 11, 2008, all of which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,670,935; 5,760,962; 5,796,094; 5,877,897; 6,097,023; 6,396,397; 6,806,452; and/or 7,339,149, and/or PCT Application No. PCT/US2003/036177 filed Nov. 14, 2003, published Jun. 3, 2004 as PCT Publication No. WO 2004/047421 A3; and/or PCT Application No. PCT/US06/041709, filed Oct. 27, 2006, and published May 10, 2007 as International Publication No. WO 07/053404, with all of the above referenced U.S. patents, patent applications and provisional applications and PCT applications being commonly assigned and being hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A predictive suspension system for a vehicle, said predictive suspension system comprising:
    an imaging sensor disposed at a vehicle and having a generally downward field of view, said field of view encompassing an area forward of a tire of the vehicle;
    an energy source operable to emit illumination in at least one linear pattern so that said at least one linear pattern is projected onto a portion of the area forward of the tire of the vehicle that is encompassed by said field of view of said imaging sensor, wherein said energy source is operable to emit two line segment patterns of illumination in a cross-hair; and
    a control for processing image data captured by said imaging sensor and detecting surface irregularities on a surface in front of the vehicle tire in response to said image processing,
    wherein said control processes said image data to detect a curvature in the captured image of at least one of said line segment patterns of illumination to determine a surface irregularity.

2. The predictive suspension system of claim 1, wherein said predictive suspension system generates an output indicative of a detection of a surface irregularity, and wherein an active suspension system is responsive to said output.

3. The predictive suspension system of claim 1, wherein said control processes said image data to determine a height or depth of a detected surface irregularity via determining a degree of curvature of said at least one of said line segment patterns of illumination.

4. The predictive suspension system of claim 1, wherein said energy source is disposed at a forward portion of the vehicle and generally in line with the tire of the vehicle, said energy source projecting said at least one linear pattern of illumination downwardly and forwardly in a direction that is generally parallel with the direction of travel of the tire.

5. The predictive suspension system of claim 1, wherein said imaging sensor is disposed at a forward portion of the vehicle and directed generally downward so as to capture images of a road surface area in front of the vehicle tire.

6. The predictive suspension system of claim 1, wherein said imaging sensor is disposed at a forward portion of the vehicle and directed generally forwardly and downwardly so as to capture images of a road surface area in front of the vehicle.

7. The predictive suspension system of claim 1, wherein said imaging sensor is disposed at or near an interior rearview mirror assembly of the vehicle and has a forward field of view through the windshield of the vehicle that encompasses a road surface area in front of the vehicle.

8. The predictive suspension system of claim 1, wherein said predictive suspension system at least one of (a) shares components or circuitry with and (b) accesses components or circuitry of at least one of a headlamp control system, a lane departure warning system, an object detection system, and a rain sensor system.

9. The predictive suspension system of claim 1 further comprising at least one other imaging device operable to capture images of the surface in front of the vehicle at a location farther forward and along the vehicle path than the area encompassed by said imaging sensor, said control processing captured images of said imaging device to provide an alert of a detected surface irregularity.

10. The predictive suspension system of claim 9, wherein one of (a) said imaging sensor frame capture rate or timing and (b) said illumination by said energy source is adjustable in response to said alert.

11. A multi-stage predictive suspension system for a vehicle, said multi-stage predictive suspension system comprising:
    a first imaging sensor disposed at a vehicle and having a field of view at least encompassing a first area forward of a tire of the vehicle;
    a second imaging sensor disposed at the vehicle and having a field of view at least encompassing a second area forward of the tire of the vehicle, said second area being closer to the tire than said first area;
    a control for processing image data captured by said first and second imaging sensors and detecting surface irregularities on a surface in front of the vehicle tire in response to said image processing, said control processing captured images of said first imaging sensor to provide an advance alert of a detected surface irregularity prior to detection of said detected surface irregularity by said second imaging sensor; and an energy source operable to emit illumination in at least one cross-hair pattern at said second area so that said at least one pattern is projected onto at least a portion of said second area forward of the tire of the vehicle that is encompassed by said field of view of said second imaging sensor, said control processing said image data captured by said second imaging sensor to detect a curvature of said at least one linear pattern that is indicative of a surface irregularity.

12. The multi-stage predictive suspension system of claim 11, wherein one of (a) said second imaging sensor frame capture rate or timing is adjustable in response to said alert, (b) said illumination by said energy source is adjustable in response to said alert, and (c) an active suspension control is adjustable in response to said alert.

* * * * *